J. E. GRAHAM & G. WALLACE.
RESILIENT WHEEL FOR MOTOR CARS AND THE LIKE.
APPLICATION FILED SEPT. 30, 1912.
1,078,430.
Patented Nov. 11, 1913.
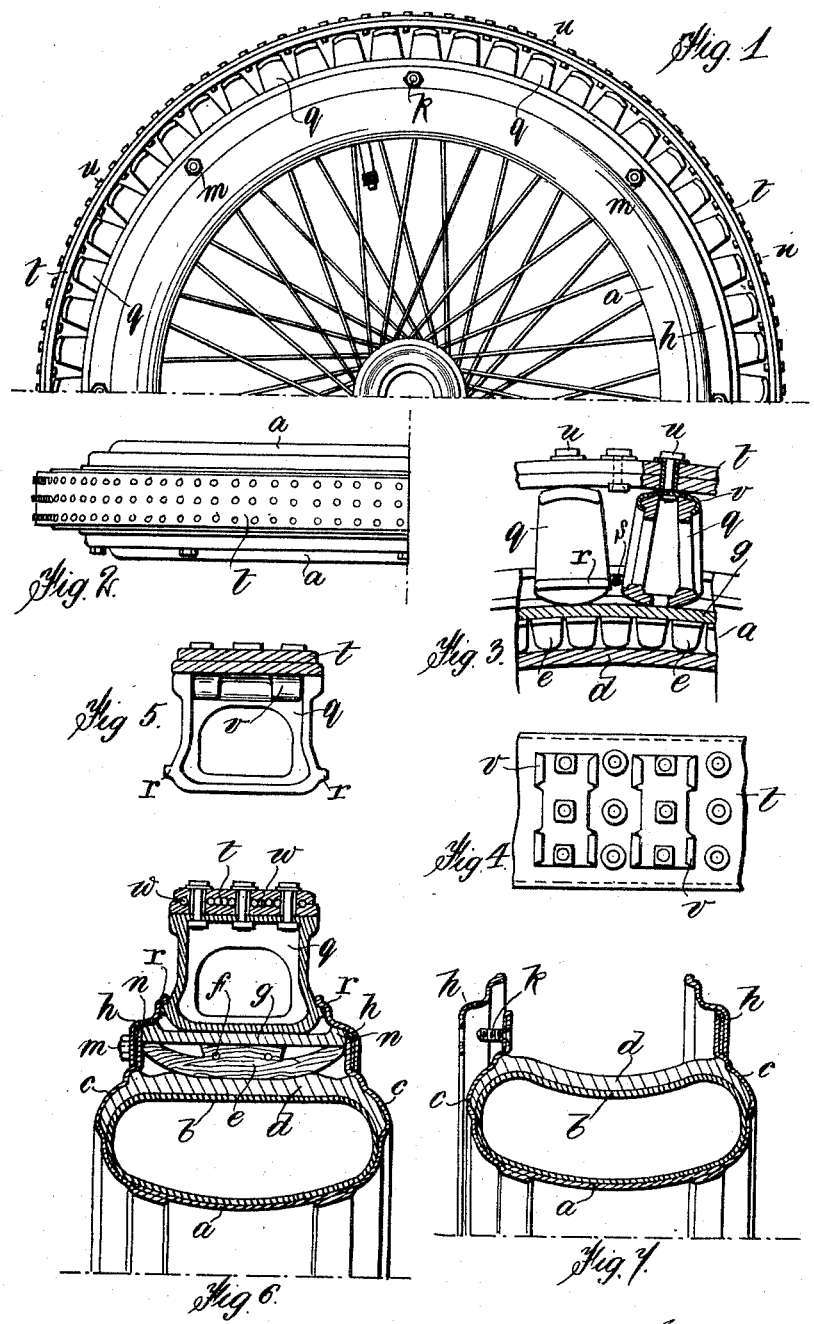

UNITED STATES PATENT OFFICE.

JOHN ELPHINSTONE GRAHAM, OF BATTERSEA PARK, AND GEORGE WALLACE, OF LONDON, ENGLAND.

RESILIENT WHEEL FOR MOTOR-CARS AND THE LIKE.

1,078,430.                Specification of Letters Patent.    Patented Nov. 11, 1913.

Application filed September 30, 1912. Serial No. 723,230.

*To all whom it may concern:*

Be it known that we, JOHN ELPHINSTONE GRAHAM and GEORGE WALLACE, subjects of the King of England, residing at 14 Albert Palace Mansions, Battersea Park, and 48 Old Compton street, London, England, respectively, have invented certain new and useful Improvements in Resilient Wheels for Motor-Cars and the like; and we do hereby declare the following to be a full, clear, and exact description of the invention, such as will enable others skilled in the art to which it appertains to make and use the same.

The present invention relates to improvements in resilient tires for vehicle wheels, and has for its purpose to provide a tire employing a plurality of units which are removable at will, and to the end that said units may be replaced when worn, thus extending the life of the tire indefinitely.

The invention has for its further purpose to provide a tire of the type in question wherein the resilient means therefor consists of an inflated tube that is located well within the tread of the tire, to the end that said tube will be guarded against puncture, or other like injury; and whereby the resilient effect of the tire in its entirety will be substantially the same as that of a pneumatic tire and yet avoiding the well known disadvantages attending the latter.

Referring to the accompanying drawing:—Figure 1 is a side elevational view, illustrating the application of the tire to a vehicle wheel; Fig. 2 is a top plan view of the same; Fig. 3 is a side elevational view on an enlarged scale of a portion of the tire tread and immediately associated parts; Fig. 4 is an inner plan view of the tread band with the tread block engaging clips secured thereto; Fig. 5 is a detail view in front elevation of one of the tread blocks, and showing the tread band in transverse section; Fig. 6 is a transverse sectional view of the tire as applied to the wheel; and Fig. 7 is a similar view, showing the pneumatic tube partly deflated on the wheel rim, and the tread block securing rings.

Referring to the construction in detail, the tire consists of a pneumatic tube $b$ mounted on the rim $a$ of the wheel, and a pair of side plates $c$ are attached to the sides of the rim $a$ by pressing, brazing, riveting, or in any other manner. A covering $d$ comprising a band of canvas, rubber, or other pliable material overlies the pneumatic tire $b$ and has its side portions fitting closely between the tube $b$ and the side plates $c$, for which purpose said plates are enlarged at these places, as clearly shown in Figs. 6 and 7.

A plurality of blocks $e$ of wood or other suitable material and of any appropriate design (see Figs. 3 and 6) are mounted upon the belt or protective covering $d$, and are distributed around the wheel at equidistant intervals. The several blocks $e$ are connected together through the medium of a pair of wires $f$ that pass through alining apertures formed in the blocks $e$, as shown in Fig. 6. By thus securing the several blocks $e$, all of said blocks may be removed in their entirety from the tire.

A band $g$ is mounted upon and overlies the ring of blocks $e$ and provides a "weather strip" adapted to prevent the ingress of water, dirt, or moisture into the interior of the tire for obvious reasons. Said band $g$ has enlarged side portions $n$ adapted to have close contact with the side ring plates $h$, that are secured to the pair of side plates $c$. One of the plates $h$ is permanently attached, as by brazing, riveting, or other means, while the other of said plates is adapted to be removably secured through the medium of a plurality of bolts $k$ and nuts $m$. The close contact between the enlarged portions $n$ of the band $g$ and the side plates $h$ provides an absolute water seal, to the end above stated.

A plurality of tread blocks $q$ are mounted on the weather strip or band $g$, and are held in position thereon through engagement of a pair of lugs $r$ on each of said blocks that engage respectively with the complementary formed portions $r'$ on side plates $h$ (see Figs. 6 and 7.) Each of the blocks $q$ is constructed of metal, to the end of obtaining maximum durability, and is centrally cut away to the end of lightness of structure. The tread blocks $q$ support the tread band $t$ which band is made preferably from two strips of leather, strengthened, or reinforced, by a plurailty of strands of wire $w$ interposed between the strips, and a plurality of rivets $u$ that pass through the two strips and in addition serve as the means for securing the tread band to the supporting blocks $q$. If preferred, the tread band $t$ may be provided with clips $v$ secured thereto by the rivets $u$, and which are adapted to receive the tread blocks $q$, as in that manner indicated in Fig. 3. A plurality of pins or bolts $s$ are provided to hold the several tread blocks $q$ in proper spaced relation and to prevent any tendency of relative movement between said blocks as might possibly occur.

In setting up the tire, the inner tube and covering band $d$ are placed within the trough provided by the side plates $c$ and wheel rim $a$. The tube is then partially inflated when the supporting blocks $e$, together with the weather strip, are placed in position on the band $d$. The several tread blocks, together with the tread band, are then applied, and the detachable side ring $h$ is fitted and secured through the medium of the bolts and nuts $k$ and $m$. The inner tube is then wholly inflated when the parts are caused to assume substantially those positions indicated in Fig. 6. When it is required to remove any of the blocks $q$ by reason of breakage or wear of the same it is necessary only to detach the removable ring $h$, when access to the block desired is had. The block to be replaced is then taken out and a new block inserted, and the ring $h$ applied and secured in the manner above stated.

What we claim is:—

1. A tire for vehicle wheels comprising a pair of side plates secured to the wheel rim, and providing a trough therewith, a tube located within said trough, a plurality of blocks supported by said tube, a band overlying said blocks, a plurality of tread blocks mounted on said band, a pair of side plates engaging with said tread blocks and the band and securing all of said blocks and said band in spaced relation, and a tread band mounted upon and secured to said tread blocks.

2. A tire for vehicle wheels comprising a pair of side plates secured to the wheel rim and providing a trough therewith, an inflatable tube located within said trough, a band overlying the tube and having its side edges disposed between the tube and the side plates, a plurality of blocks mounted on said band, means securing said blocks in spaced relation, a band overlying said blocks, a plurality of tread blocks overlying the second named band, a pair of side plates engaging with said tread blocks, the second named band and secured to the first named side plates, and a tread band mounted on said tread blocks.

In testimony whereof, we affix our signatures, in presence of two witnesses.

JOHN ELPHINSTONE GRAHAM.
GEORGE WALLACE.

Witnesses:
A. BROWNE,
LILY SIMMONDS.

---

Copies of this patent may be obtained for five cents each, by addressing the "Commissioner of Patents, Washington, D. C."